United States Patent
Kang et al.

(10) Patent No.: US 8,804,052 B2
(45) Date of Patent: Aug. 12, 2014

(54) SYSTEM AND METHOD FOR FILTERING A TELEVISION CHANNEL LIST BASED ON CHANNEL CHARACTERISTICS

(75) Inventors: Byung Chan Kang, Downey, CA (US); Taehee Kim, Montville, NJ (US); Paul Kim, Mahwah, NJ (US)

(73) Assignee: Samsung Electronics Co., Ltd., Suwon (KR)

( * ) Notice: Subject to any disclaimer, the term of this patent is extended or adjusted under 35 U.S.C. 154(b) by 1621 days.

(21) Appl. No.: 12/029,815

(22) Filed: Feb. 12, 2008

(65) Prior Publication Data

US 2009/0204995 A1      Aug. 13, 2009

(51) Int. Cl.
*H04N 7/025* (2006.01)
*H04N 7/015* (2006.01)
*H04N 21/44* (2011.01)
*H04N 21/482* (2011.01)

(52) U.S. Cl.
CPC ......... *H04N 21/44008* (2013.01); *H04N 7/015* (2013.01); *H04N 7/025* (2013.01); *H04N 21/4826* (2013.01)
USPC ........... 348/732; 348/731; 348/461; 348/720; 348/725; 725/38; 725/56

(58) Field of Classification Search
CPC . H04N 7/015; H04N 7/025; H04N 21/44008; H04N 21/4826
USPC ............ 348/732, 731, 461, 720, 725; 725/38, 725/51, 40
See application file for complete search history.

(56) References Cited

U.S. PATENT DOCUMENTS

| | | | |
|---|---|---|---|
| 5,283,653 A * | 2/1994 | Citta | 348/725 |
| 6,542,609 B1 * | 4/2003 | Ryan et al. | 380/210 |
| 7,174,126 B2 * | 2/2007 | McElhatten et al. | 455/3.04 |
| 2003/0056216 A1 | 3/2003 | Wugofski et al. | |
| 2004/0261098 A1 * | 12/2004 | Macrae et al. | 725/31 |
| 2005/0015804 A1 * | 1/2005 | LaJoie et al. | 725/44 |
| 2005/0086693 A1 * | 4/2005 | Shintani | 725/54 |
| 2006/0274202 A1 * | 12/2006 | Kim | 348/554 |
| 2007/0064150 A1 * | 3/2007 | Lee | 348/468 |
| 2008/0098427 A1 * | 4/2008 | Kim | 725/38 |

FOREIGN PATENT DOCUMENTS

| | | |
|---|---|---|
| KR | 1020060127544 | 12/2006 |
| KR | 100684025 | 2/2007 |
| KR | 1020070032465 | 3/2007 |

OTHER PUBLICATIONS

Korean Office Action dated Mar. 17, 2014 for Korean Patent Application No. 10-2008-0057024 from Korean Intellectual Property Office, pp. 1-6, Seo-gu, Daejeon, 302-701, Republic of Korea [Machine-generated English-language Translation, pp. 1-9].

* cited by examiner

*Primary Examiner* — Jefferey Harold
*Assistant Examiner* — Jean W Desir
(74) *Attorney, Agent, or Firm* — Kenneth L. Sherman, Esq.; Michael Zarrabian, Esq.; Sherman & Zarrabian LLP

(57) ABSTRACT

A system and method for automatically managing television channel lists is disclosed. Pixel resolutions characteristics of a plurality of televisions channels are analyzed. One or more high definition television (HDTV) channels having HD pixel resolutions from the plurality of available television channels are selected. The one or more selected HDTV channels are stored in a HD channel list.

25 Claims, 4 Drawing Sheets

SYSTEM AND METHOD FOR FILTERING A TELEVISION CHANNEL LIST BASED ON CHANNEL CHARACTERISTICS

BACKGROUND OF THE INVENTION

1. Field of the Invention

The present invention relates to management of television channels, and in particular, to automatic management of high definition (HD) channel lists.

2. Description of the Related Technology

High definition (HD) television broadcast channels, while becoming increasingly more available, still remain a small percentage of all available air and cable channels. Usually, cable channels do not contain any Program and System Information Protocol (PSIP) information, and cable companies typically do not provide the channel list to the public. Therefore, viewers, in the beginning, do not know where any of the HDTV channels are located. Unlike most air feeds, which sometimes have channel names that indicate HD, channel names for cable channels typically do not have any indications of HD. Therefore, viewers that receive cable channels, therefore, often have to scroll through all channels to find available HD channels.

Adding to the difficulty of finding available HD channels is the fact that digital television channels have physical channel numbers and virtual channel numbers associated with them. The physical channel number is the actual channel number from where the channel is being broadcast. The virtual channel number, which is optional, is the channel number that can be used for repositioning the channel on a digital TV. For example, ABC-HD can be broadcast on physical channel 84-2 and have a virtual channel number of 7-1. As a result, on a digital TV, ABC-HD will come out on 7-1 instead of 84-2. Unfortunately, many channels on cable do not have these virtual channel numbers which make finding channels easier for viewers. Therefore, it results in the viewer being even more confused on where to find the HD channels. They do not know the physical channel numbers, and these numbers are not disclosed to the viewer by the cable provider.

While a favorite channel list, which is available in some television sets, can be used to store the HDTV channels, the viewers would still initially have to manually locate the HDTV channels. In addition, when a stored HD channel is no longer available or a new HD channel is added to the cable programming, the favorite channel list needs to be manually updated. Therefore, it would be desirable to have a television set with an integral capability to manage HD channel lists, including automatically generating and updating HD channel lists.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly.

In one embodiment, there is a method of automatically managing television channel lists, the method comprising programmatically analyzing pixel resolutions characteristics of a plurality of television channels, selecting one or more high definition television (HDTV) channels having HD pixel resolutions from the plurality of available television channels, and storing the one or more selected HDTV channels in a HD channel list.

In another embodiment, there is a system for automatically managing television channel lists, the system comprising a processor configured to programmatically analyze pixel resolutions characteristics of a plurality of television channels, and select one or more high definition television (HDTV) channels having HD pixel resolutions from the plurality of television channels; and a memory in data communication with the processor, and configured to store a HD channel list including the one or more selected HDTV channels.

In another embodiment, there is a method for automatically managing television channel lists, the method comprising determining that an high definition (HD) device is tuned to a television channel, programmatically analyzing the quality of a signal for the television channel, determining whether the television channel is included in an existing high-definition (HD) channel list, and updating the existing HD channel list with the television channel depending on the quality of the signal.

In another embodiment, there is a system for automatically managing television channel lists, the system comprising a processor configured to determine that a high definition (HD) device is tuned to a television channel, programmatically analyze the quality of a signal for the television channel, determine whether the television channel is included in an existing high-definition (HD) channel list, and update the existing HD channel list with the television channel depending on the quality of the signal; and a memory in data communication with the processor and configured to store the HD channel list.

In another embodiment, there is a method for automatically managing television channel lists, the method comprising programmatically analyzing a plurality of television channels for selection characteristics; selecting one or more channels having the selection characteristics; and storing the one or more selected channels in a channel list configured to list those television channels having the selection characteristics.

DETAILED DESCRIPTION OF CERTAIN INVENTIVE EMBODIMENTS

Certain embodiments provide a method and system for automatically managing high definition (HD) channel lists.

The following detailed description is directed to certain sample embodiments of the invention. However, the invention can be embodied in a multitude of different ways as defined and covered by the claims. In this description, reference is made to the drawings wherein like parts are designated with like numerals throughout.

Various embodiments to be described below can be embodied in various types of HD devices that are capable of receiving and displaying high definition (HDTV) channels. Such HD devices can include HD television (TV) sets, personal computers (PCs) or laptops, PDAs, cellular phones, and the like. Alternatively, various embodiments can also be embodied in peripheral devices that are in data communication with HD devices such as DVD players, cable modems, set-up boxes, video adapters for PCs and laptops, and the like. Some of the devices include a processor such as a microprocessor, a microcontroller, a digital signal processor, a high definition video processor (HDVP), and the like, that is capable of processing data inputs from different TV channels and make certain decisions based on the data inputs. The devices can also include a memory such as a random access memory, a flash memory, a hard disk, and the like, that is capable of storing HD channel lists.

I. Generation of HD Channel Lists by Auto Program Function

Figure 1:
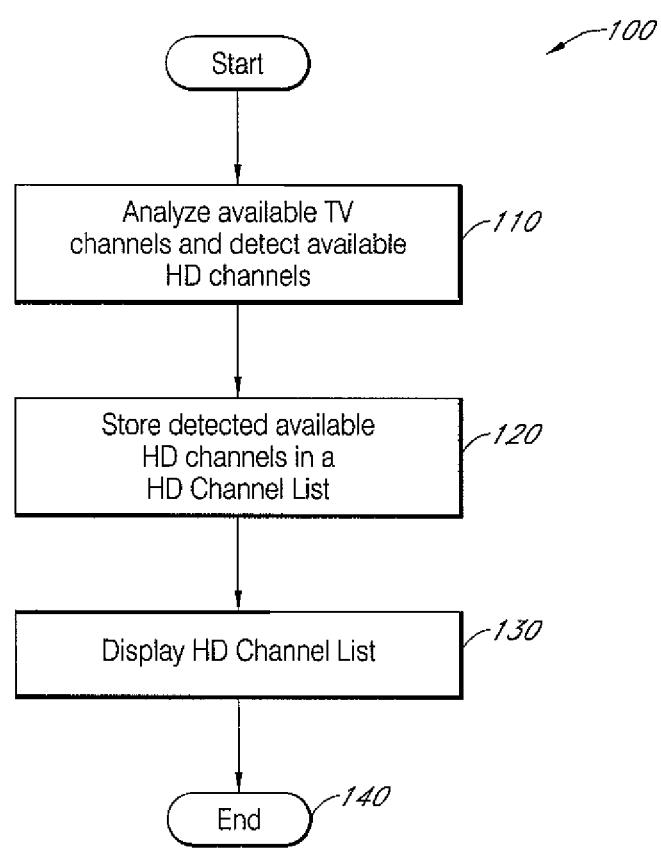
FIG. 1 is a flowchart illustrating an example process for generating a high definition (HD) channel list according to certain embodiments.

FIG. 1 is a flowchart illustrating an example process 100 for generating a high definition (HD) channel list according to certain embodiments. The example process 100 starts at state 10, where signals from available TV channels are analyzed, and HD television (HDTV) channels, if any, among the available TV channels are detected. This process for generating a HD channel list is typically initiated when an auto program function found in most television sets is executed by a user pressing an Auto Program button on a remote control or on-screen menu, for example. In one embodiment, a HD channel is defined as a TV channel having a pixel resolution of 720p or higher. In certain embodiments, the HD channel detection can be accomplished by analyzing Moving Picture Experts Group (MPEG) sequence headers of the available channels and determining the pixel resolutions of the channels. The process then moves to state 120, where the channels that are determined to be HDTV channels are stored in a HD channel list. In certain embodiments, the process further moves to state 130, where the contents of the newly generated HD channel list are displayed on a display screen automatically when the Auto Program function is completed or when requested by a viewer. The example process 100 then ends at state 140.

Figures 2, 3:
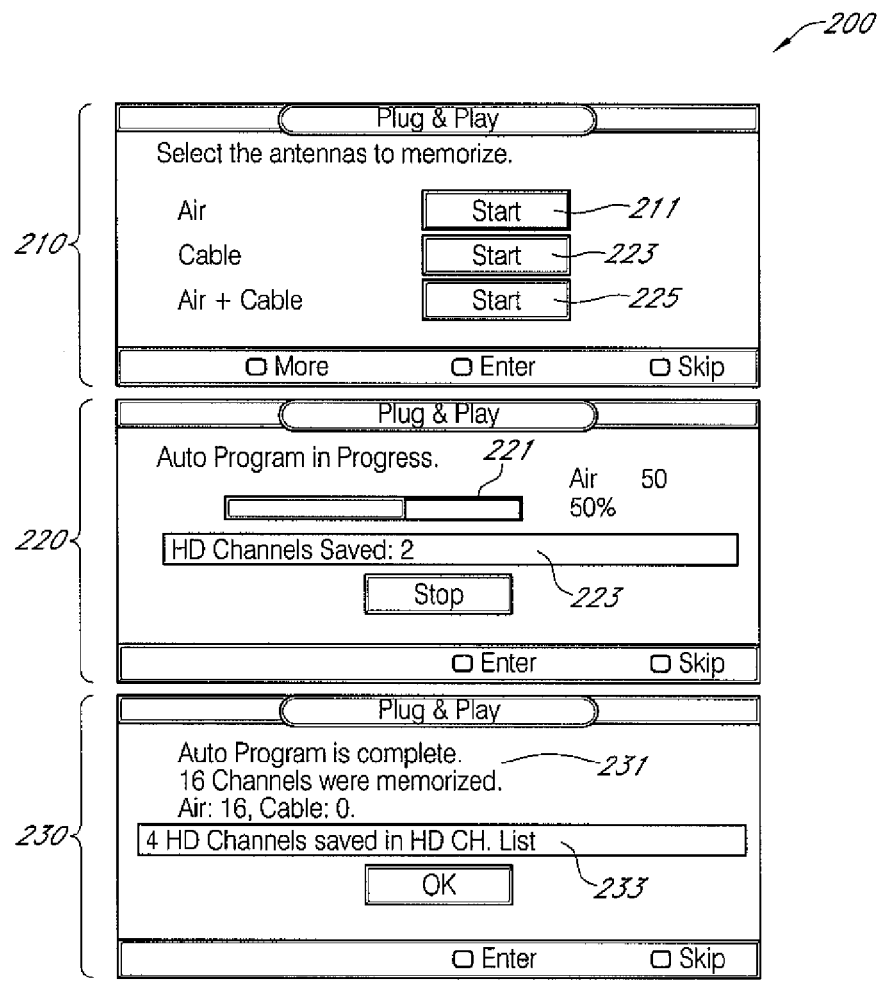
FIG. 2 is a collection of screen shots of dialog boxes for illustrating an example auto program procedure that includes the automatic generation of a HD channel list such as the one illustrated in FIG. 1 according to certain embodiments.
FIG. 3 shows an example screen shot displaying contents of a HD channel list according to certain embodiments.

FIG. 2 is a collection of screen shots of dialog boxes for illustrating an example auto program procedure that includes the automatic generation of a HD channel list such as the one illustrated in FIG. 1 according to certain embodiments. A first dialog box 210 appears on the display screen when an auto program function is launched by, for example, a user pressing an Auto Program button on a remote control or on-screen menu. The first dialog box 210 lists three possible sources of available channels—Air 211, Cable 213, and Air+Cable 215—and prompts the user to select one of the three possible sources. When the user makes the source selection on the first dialog box by pressing a button for the Air source 211, for example, a second dialog box 220 appears and displays a progress bar graph 221 for the auto program procedure.

During the example auto program procedure, available channels in the selected source are discovered and mapped into a channel map, and, in addition, pixel resolutions of the discovered channels are analyzed to detect HDTV channels among the discovered available channels as described above with reference to FIG. 1. In certain embodiments, the two procedures—discovering available channels and detecting HDTV channels among the available channels—are performed concurrently. In certain other embodiments, the detection of HDTV channels may not start until after all available channels have been discovered and mapped into a channel map. While the available channels are being discovered and analyzed, a message box 223 inside the second dialog box 220 can display a number of HDTV channels that have been so far detected. After all the available channels have been discovered and all HDTV channels among the available channels have been detected, a third dialog box 230 appears and displays a message box 231 indicating the completion of the auto program procedure and another message box 233 indicating a total number of HDTV channels that have been detected during the auto program procedure. At this stage, the detected HDTV channels have been stored in a new HD channel list.

In certain embodiments, the user can view the contents of the HD channel list after it has been generated. FIG. 3 shows an example screen shot 300 displaying contents of a HD channel list according to certain embodiments. The example screen shot includes a table 301 including rows listing detected HDTV channels 340 and columns 310, 320, and 330 listing different properties of the HDTV channels. The columns include a channel column 310, a name column 320, and a resolution column 330. The channel column 310 lists channel numbers of the HDTV channels, e.g., "13-1." The name column 320 lists the names of the HDTV channels, e.g., "NBC HD." The resolution column 330 lists pixel resolutions of the HDTV channels, e.g., "720p." In certain embodiments, the user can select a listed HD channel 341, e.g., Channel 13-1, and tune to the HD channel by clicking on the selected HD channel.

II. Generation or Update of HD Channel Lists by HD Auto Program Function

In certain embodiments, a new HD channel list is generated or updated by analyzing only those channels previously mapped to a channel map instead of discovering and analyzing all new available channels as described above with reference to FIG. 1. These embodiments can occur in two different contexts. In one context, a new HD channel list is not automatically and simultaneously generated when the auto program function is executed as described above with reference to FIG. 2. Instead, a new HD channel list is generated when a separate functions HD auto program-is executed by a user pressing a HD Auto Program button on a remote control or on-screen menu, for example. In another context, an existing HD list gets updated when the HD auto program function is launched and executed. In the second context, the HD auto program function is typically launched when there have been major changes to the air/cable signals.

Figure 4:
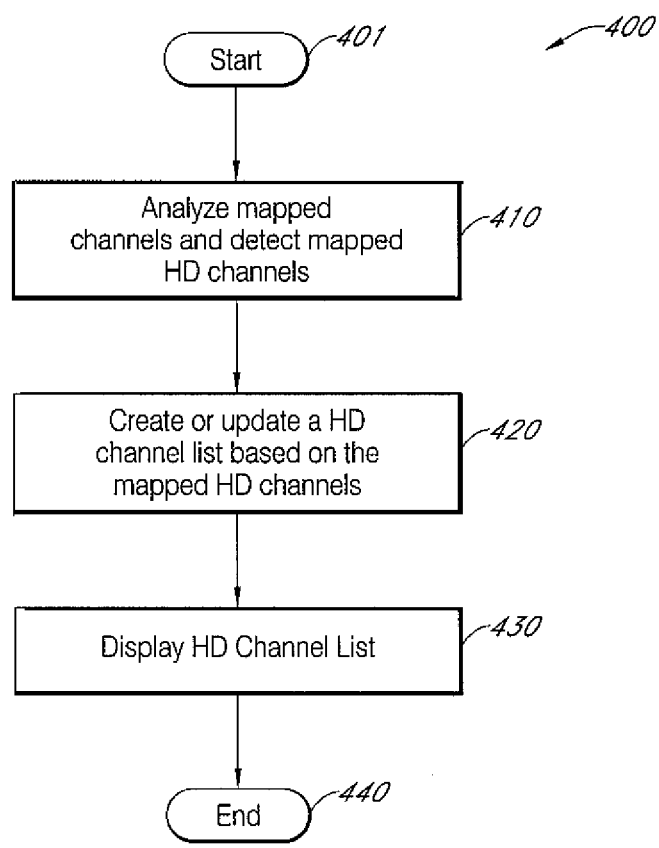
FIG. 4 is a flowchart illustrating an example HD auto program process for creating or updating a HD channel list according to certain embodiments.

FIG. 4 is a flowchart illustrating an example HD auto program process 400 for creating or updating a HD channel list according to certain embodiments. The example process 400 starts at state 401 when a HD auto program function is launched. In certain embodiments, the function is launched by a user pressing a HD Auto Program button on a remote control or on-screen menu, for example. In other embodiments, the HD auto program can be launched automatically by a processor at certain scheduled intervals. In yet other embodiments, the HD auto program can be launched automatically when the processor detects major changes in the air/cable signals. The process then moves to state 410, where only those channels that are mapped to a channel map are analyzed for HD quality, and mapped HDTV channels are detected. This can be accomplished, for example, by analyzing MPEG sequence headers of the mapped television channels. The process then moves to state 420, where a new HD channel list is created or an existing HD channel is updated based on the mapped HDTV channels. As an example of an update, some or all of the channels in the existing HD channel list that are not newly detected mapped HDTV channels are deleted from the HD channel list. Additionally or alternatively, some of the newly detected mapped HDTV channels that are not in the existing HD channel list are added to the HD channel list. In certain embodiments, the process further moves to state 430, where the contents of the newly generated HD channel list are displayed on a display screen automatically when the HD Auto Program function is completed or when requested by a viewer. The example process 400 then ends at state 440.

III. Update of HD Channel List by Analyzing Tuned Channels

In certain embodiments, not only is the HD channel list generated or updated when the Auto Program or the HD Auto Program function is executed by a user as described above, but the HD channel list is also updated automatically even if the Auto Program or the HD Auto Program functions is not executed by a user. For example, in the embodiments to be described below, a process for an update of a HD channel list can be launched whenever a TV is tuned to a new channel. In that example, the newly tuned channel is analyzed for usability of the signal and/or HD quality and can be either added to or deleted from the existing HD channel list.

Figure 5:
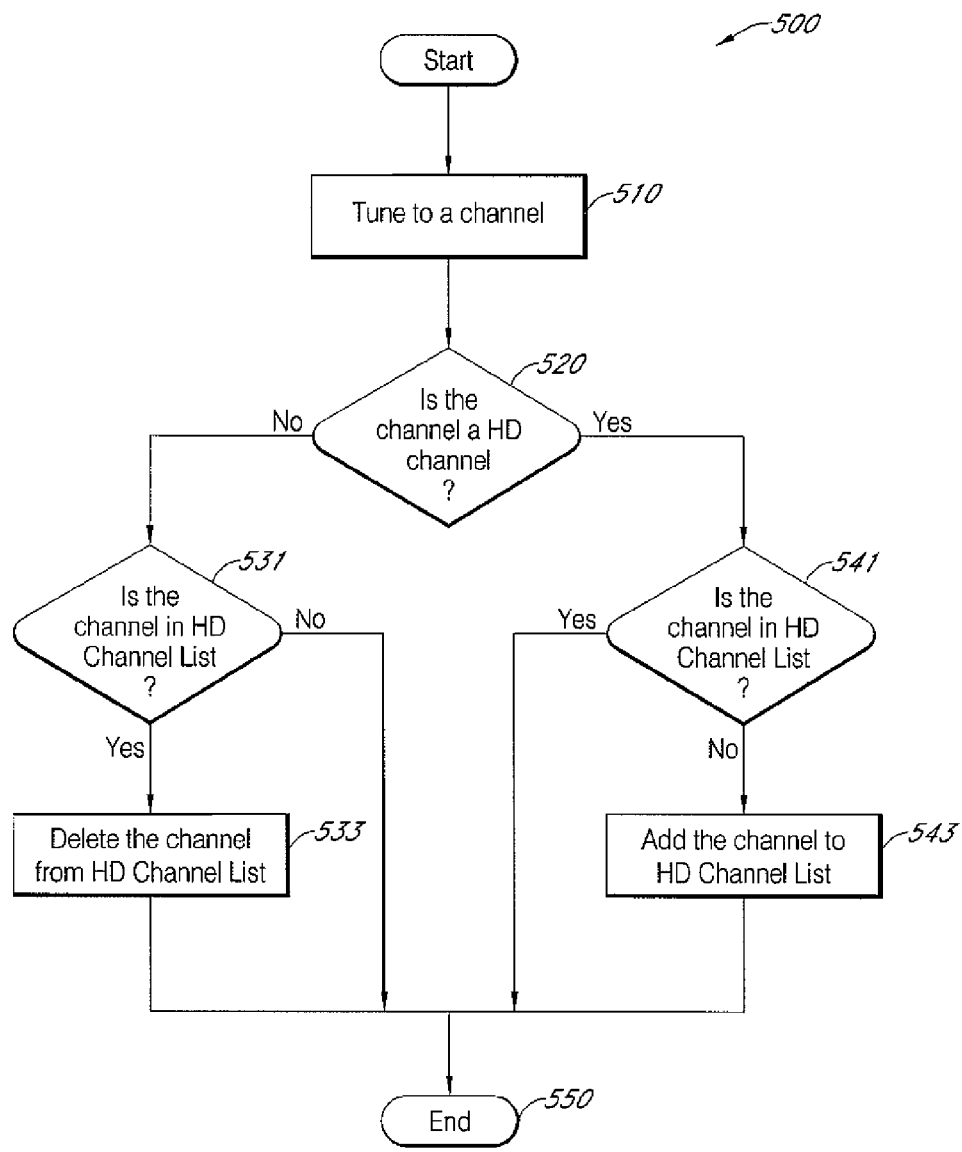
FIG. 5 is a flowchart illustrating an example process for automatically updating a HD channel list by analyzing a tuned channel according to certain embodiments.

FIG. 5 is a flowchart illustrating an example process 500 for automatically updating a HD channel list by analyzing a tuned channel according to certain embodiments. The process starts at a state 510, a HD device, e.g., a HDTV, is tuned to a television channel. In certain embodiments, the state 510 is reached when the HD device tuned to the channel by the action of the viewer, e.g., a manual tuning via a remote control. In other embodiments, the state 510 is reached when the HD device programmatically scans different channels in search of HD channels. The process moves to a decisional state 520, where it is determined whether the channel is a HD channel. This determination includes analyzing the signal for the channel for its HD quality pixel resolutions. In certain embodiments, the HD quality corresponds to a pixel resolution of 720p or more. This can be accomplished, for example, by analyzing the channels' MPEG sequence headers. The determination of the decisional state 520 can also includes analyzing the signal for its usability, e.g., whether the HD device to generate a viewable content from the signal. Examples of channels carrying unusable signals include channels carrying no or very poor quality (e.g., low S/N ratio) signals and channels carrying scrambled signals.

If the answer for the decisional state 520 is NO (the channel is not a HD channel or is carrying an unusable signal), the process proceeds to another decisional state 531, where it is determined whether the usable HD channel is stored in the HD channel list. If the answer for the decisional state 531 is NO (not in the HD channel list), the process ends at state 550. If the answer for the decisional state 531 is YES (in the HD channel list), the process moves to a state 533, where the channel is removed from the HD channel list. The process then ends at state 550.

If the answer for the decisional state 520 is YES (the channel is a HD channel and is usable), the process proceeds to another decisional state 541, where it is determined whether the usable HD channel is stored in the HD channel list. If the answer for the decisional state 541 is YES (in the HD channel list), the process ends at state 550. If the answer to the decisional state 541 is NO (not in the HD channel list), the process moves to a state 543, where the channel is added to the HD channel list. The process then ends at state 550.

Certain embodiments of the automatic management of HD channel list described above can be implemented in conjunction with some existing channel filtering technologies. For example, some TVs, e.g., ClearQAM TVs, have auto program feature that discovers all available channels and then detects and removes scrambled channels from the channel map. The capability to filter out the scrambled channels in those TVs can be integrated with certain embodiments described above so that the HD channel list would contain HDTV channels that are not scrambled.

IV. Automatic Management of Channel Characteristics List

In the preceding sections, various embodiments automatic management of HD channel lists were described. In those embodiments, certain characteristics or qualifies of channels are analyzed, and determinations are made as to whether to include or delete the channels from the HD channel list. The characteristics or qualities being analyzed for automatically managing HD channel lists are channels with HD pixel resolutions. It would be apparent to one skilled in the art that the system and method for automatically managing HD channel lists described above in Sections I, II, and III can be generalized to automatically managing lists directed to alternative channel characteristics. Examples of the alternative characteristics include, but not limited to, channels with Second Audio Program (SAP), channels with captions for viewers with hearing impairments, foreign language channels with English subtitles, and the like. Much the same way the automatically managed HD channel lists can help users to quickly locate and view HDTV channels, the automatically managed alternative characteristics lists can also help users to quickly locate and view channels having the alternative characteristics. For example, a channel with all SAP available channels can be helpful for viewers who only know Spanish, and a channel list with all caption available channels can be helpful for viewers who are hearing impaired. The system and method for automatically managing a list for alternative characteristics are basically the same as those for automatically managing the HD channel list described above except that channels (all available, mapped, etc.) are analyzed for the alternative characteristics, e.g., channels having SAP, rather than for pixel resolutions characteristics.

The above-described method of channel characteristics list management including HD channel list generating and update may be realized in a program format to be stored on a computer readable recording medium that includes any kinds of recording devices for storing computer readable data, for example, a CD-ROM, a DVD, a magnetic tape, a memory (e.g., capable of storing firmware), memory card and a disk.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of automatically managing television channel lists, the method comprising:
   programmatically analyzing pixel resolutions characteristics of a plurality of television channels;
   selecting one or more high definition television (HDTV) channels having high definition (HD) pixel resolutions from the plurality of available television channels;
   storing the one or more selected HDTV channels in a HD channel list; and
   displaying on a television screen the HD channel list in a table format having a plurality of rows for the HDTV channels, a channel column displaying physical channel numbers of the HDTV channels, a name column displaying names of the HDTV channels, and a resolution column displaying pixel resolutions of the HDTV channels.

2. The method of claim 1, wherein analyzing the pixel resolutions characteristics includes analyzing Moving Picture Experts Group (MPEG) sequence headers of the television channels.

3. The method of claim 1, wherein the selected HDTV channels have HD pixel resolutions of 720p or higher.

4. The method of claim 1, wherein the HD channel list includes only HDTV channels.

5. The method of claim 1, wherein the HD channel list is automatically generated when an auto program function is executed, wherein the auto program function is configured to:
   discover a plurality of available television channels from one or more sources;
   store the plurality of available television channels in a channel map;
   analyze the pixel resolution of the plurality of available television channels;
   select the one or more HDTV channels having the HD pixel resolutions from the plurality of available television channels; and
   generate the HD channel list with the one or more selected HDTV channels.

6. The method of claim 1, wherein the HD channel list is automatically generated or updated when a HD auto program function is executed, wherein the HD auto program function is configured to:
   retrieve a plurality of mapped television channels stored in a channel map;
   analyze the pixel resolutions of the plurality of mapped television channels;
   select the one or more HDTV channels having the HD pixel resolutions from the plurality of mapped television channels; and
   generate or update the HD channel list with the one or more selected HDTV channels.

7. The method of claim 1, further comprising providing a graphical user interface (GUI) for the HD channel list, wherein the GUI is configured to list at least one of channel numbers, channel names, and pixel resolutions for the HDTV channels.

8. A system for automatically managing television channel lists, the system comprising:
   a processor configured to:
      programmatically analyze pixel resolutions characteristics of a plurality of television channels; and
      select one or more high definition television (HDTV) channels having high definition (HD) pixel resolutions from the plurality of television channels;
   a memory in data communication with the processor, and configured to store a HD channel list including the one or more selected HDTV channels; and
   a television screen displaying the HD channel list in a table format having a plurality of rows for the HDTV channels, a channel column displaying physical channel numbers of the HDTV channels, a name column displaying names of the HDTV channels, and a resolution column displaying pixel resolutions of the HDTV channels.

9. The system of claim 8, wherein the processor analyzes the pixel resolutions characteristics by analyzing Moving Picture Experts Group (MPEG) sequence headers of the plurality of television channels.

10. The system of claim 8, further comprising a graphical user interface (GUI) for the HD channel list, wherein the GUI is configured to list at least one of channel numbers, channel names, and pixel resolutions for the HDTV channels.

11. The system of claim 8, wherein the processor is further configured to generate the HD channel list when an auto program function is executed, wherein the auto program function is configured to:
   discover a plurality of available television channels from one or more sources;
   store the plurality of available television channels in a channel map;
   analyze the pixel resolution of the plurality of available television channels;
   select the one or more HDTV channels having the HD pixel resolutions from the plurality of available television channels; and
   generate the HD channel list with the one or more selected HDTV channels.

12. The system of claim 8, wherein the processor is further configured to generate or update the HD channel list when a HD auto program function is executed, wherein the HD auto program function is configured to:
   retrieve a plurality of mapped television channels stored in a channel map;
   analyze the pixel resolutions of the plurality of mapped television channels;
   select the one or more HDTV channels having the HD pixel resolutions from the plurality of mapped television channels; and
   generate or update the HD channel list with the one or more selected HDTV channels.

13. The system of claim 12, wherein the channel map includes those television channels that were discovered as available television channels in a previous execution of an auto program function.

14. A method of automatically managing television channel lists, the method comprising:
   determining that an high definition (HD) device is tuned to a television channel;
   programmatically analyzing the quality of a signal for the television channel;
   determining whether the television channel is included in an existing high-definition (HD) channel list;
   updating the existing HD channel list with the television channel depending on the quality of the signal; and
   displaying on a television screen the HD channel list in a table format having a plurality of rows for the high definition television (HDTV) channels, a channel column displaying physical channel numbers of the HDTV channels, a name column displaying names of the HDTV channels, and a resolution column displaying pixel resolutions of the HDTV channels.

15. The method of 14, wherein:
analyzing the quality of the signal includes determining pixel resolutions of the signal; and
updating the existing HD channel list includes adding the television channel to the existing HD channel list if it is determined that the signal is a HD quality signal.

16. The method of 14, wherein:
analyzing the quality of the signal includes determining usability of the signal; and
updating the existing HD channel list if it is determined that the signal is unusable.

17. The method of claim 15, wherein the unusable signal is a scrambled HD signal.

18. A system for automatically managing television channel lists, the system comprising:
   a processor configured to:
      determine that a high definition (HD) device is tuned to a television channel;

programmatically analyze the quality of a signal for the television channel;

determine whether the television channel is included in an existing high-definition (HD) channel list; and update the existing HD channel list with the television channel depending on the quality if the signal;

a memory in data communication with the processor and configured to store the HD channel list; and a television screen displaying the HD channel list in a table format having a plurality of rows for the high definition television (HDTV) channels, a channel column displaying physical channel numbers of the HDTV channels, a name column displaying names of the HDTV channels, and a resolution column displaying pixel resolutions of the HDTV channels.

19. The system of claim 18, wherein the processor is further configured to:

determine pixel resolutions characteristics of the signal; and add the television channel to the existing HD channel list if it is determined that the signal is a HD quality signal.

20. The system of claim 18, wherein the processor is further configured to:

determine a usability of the signal; and remove the television channel from the existing HD channel list if it is determined that the signal is unusable.

21. A method of automatically managing channel lists in a television, the method comprising:

programmatically analyzing a plurality of television channels for selection characteristics;

selecting one or more channels having the selection characteristics;

storing the one or more selected channels in a channel list configured to list those television channels having the selection characteristics; and displaying on a television screen the channel list in a table format including a plurality of rows for high definition television (HDTV) channels having the selection characteristics, a channel column displaying physical channel numbers of the HDTV channels, a name column displaying names of the HDTV channels, and a resolution column displaying pixel resolutions of the HDTV channels.

22. The method of claim 21, further comprising deleting one or more nonselected channels from the channel list.

23. The method of claim 21, wherein the selection characteristics include channels having the high-definition (HD) pixel resolutions of 720 or higher.

24. The method of claim 21, wherein the selection characteristics include channels having a second audio program (SAP).

25. The method of claim 21, wherein the selection characteristics include channels having captions for persons with hearing impairments.

* * * * *